US006576181B1

United States Patent
Yeh (10) Patent No.: US 6,576,181 B1
(45) Date of Patent: Jun. 10, 2003

(54) METHOD OF MAKING A HIGH GASOLINE PERMEATION RESISTANT PLASTIC CONTAINER

(75) Inventor: Jen-Taut Yeh, Taipei (TW)

(73) Assignee: Chinese Petroleum Corp., Taipei (TW)

( * ) Notice: Subject to any disclaimer, the term of this patent is extended or adjusted under 35 U.S.C. 154(b) by 0 days.

(21) Appl. No.: 09/723,125

(22) Filed: Nov. 27, 2000

(51) Int. Cl.[7] .............................................. B29C 49/00
(52) U.S. Cl. ...................................................... 264/523
(58) Field of Search ......................................... 264/523

(56) References Cited

U.S. PATENT DOCUMENTS

| | | | |
|---|---|---|---|
| 2,811,468 A | 10/1957 | Joffre | 117/95 |
| 3,373,222 A | 3/1968 | Armstrong | 260/857 |
| 3,373,223 A | 3/1968 | Armstrong | 260/857 |
| 3,373,224 A | 3/1968 | Mesrobian | 260/857 |
| 3,857,754 A | 12/1974 | Hirata et al. | 161/227 |
| 3,862,284 A | 1/1975 | Dixon et al. | 264/83 |
| 3,873,667 A | 3/1975 | Preto et al. | 264/234 |
| 3,975,463 A | 8/1976 | Hirata et al. | 260/897 |
| 3,998,180 A | 12/1976 | Hawkins et al. | 118/5 |
| 4,081,574 A | 3/1978 | Hawkins et al. | 427/237 |
| 4,142,032 A | 2/1979 | D'Angelo | 526/43 |
| 4,182,457 A | 1/1980 | Yamada et al. | 215/1 |
| 4,394,333 A | 7/1983 | Fukushima et al. | 264/37 |
| 4,410,482 A | 10/1983 | Subramanian | 264/515 |
| 4,416,942 A | 11/1983 | DiLuccio | 428/332 |
| 4,444,817 A | 4/1984 | Subramanian | 428/536 |
| 4,467,075 A | 8/1984 | Tarancon | 525/356 |
| 4,950,513 A | 8/1990 | Mehra | 428/36.7 |
| 5,712,043 A * | 1/1998 | Chen et al. | 428/500 |
| 6,177,162 B1 * | 1/2001 | Siour et al. | 138/137 |

FOREIGN PATENT DOCUMENTS

| | | | |
|---|---|---|---|
| JP | 55-080439 | 6/1980 | C08J/7/10 |
| JP | 59-101726 | 6/1984 | B29D/23/03 |
| JP | 59-103727 | 6/1984 | B29D/23/03 |

OTHER PUBLICATIONS

Sacks, William. "Multilayer Packaging Containers." ChemTech. Aug. 1988 pp. 480–483.

Hobbs, J.P. et al. "Fluorinated High–Density Polyethylene Barrier Containers." American Chemical Society. 1990. pp. 280–294.

Walles, W. E.. "Improvement in Barrier Properties of Polymers Via Sulfonation and Reductive Metallization." American Chemical Society. 1990. Pp. 266–279.

* cited by examiner

Primary Examiner—Suzanne E. McDowell
(74) Attorney, Agent, or Firm—Brown & Michaels, PC (57) ABSTRACT

A process for producing a high gasoline permeation resistant plastic blend container, comprising preparing a modified polyamide by modifying polyamide with a compatibilizer precursor and then laminar blend blow-molding using a cheap conventional blow-molding machine from a composition of a polyolefin incorporated with a modified polyamide (MPA) into a bottle. The invention relates further to a high gasoline permeation resistant container obtained according to the above-described process, characterized in that it consists of a MPA laminar structure within a HDPE matrix, and has a gasoline permeation resistance of less than 5 vol. % of the total gasoline content thereof after storage at 40° C. for one year.

9 Claims, 10 Drawing Sheets

The gasoline permeation rates of the as-blow-molded PE bottle (●) and PE bottles annealed at various temperature for 1(○), 2(○), 4(○), 8(○), 16(○), 24(○) and 32(○) hrs.

Figure 1 The gasoline permeation rates of the as-blow-molded PE bottle (●) and PE bottles annealed at various temperature for 1(○), 2(○), 4(○), 8(○), 16(○), 24(○) and 32(○) hrs.

Figure 2 The gasoline permeation rates of the as-blow-molded PE/PA bottle (▲) and PE/PA bottles annealed at various temperature for 1(▲), 2(▲), 4(△), 8(△), 16(△), 24(△) and 32(△) hrs.

Figure 3 The gasoline permeation rates of the as-blow-molded PE/MPA bottle (■) and PE/MPA bottles annealed at various temperature for 1(□), 2(□), 4(□), 8(□), 16(□), 24(□) and 32(□) hrs.

(a)

(d)

(b)

(e)

(c)

(f)

Figure 4 Fracture surfaces of the as-blow-molded (a)PE, (b)PE/PA, (c)PE/MPA and (d)PE, (e)PE/PA and (f)PE/MPA bottles annealed at 110°C for 32 hrs.

Figure 5a Percentage crystallinity values of the as-blow-molded PE bottle (●) and PE bottles annealed at various temperatures for 1(o), 2(o), 4(o), 8(o), 16(○), 24(○) and 32(○) hrs.

Figure 5b Percentage crystallinity values of PE(●) in the as-blow-molded PE/PA bottle and PE/PA bottles annealed at various temperatures for 1(○), 2(○), 4(○), 8(○), 16(○), 24(○) and 32(○) hrs; percentage crystallinity values of PA(▲) in the as-blow-molded PE/PA bottle and PE/PA bottles annealed at various temperatures for 1(△), 2(△), 4(△), 8(△), 16(△), 24(△) and 32(△) hrs.

Figure 5c Percentage crystallinity values of PE(●) in the as-blow-molded PE/MPA bottle and PE/MPA bottles annealed at various temperatures for 1(₀), 2(o), 4(o), 8(O), 16(O), 24(O) and 32(O) hrs; percentage crystallinity values of MPA(▲) in the as-blow-molded PE/MPA bottle and PE/MPA bottles annealed at various temperatures for 1(₀), 2(◻), 4(◻), 8(◻), 16(◻), 24(◻) and 32(◻) hrs.

Figure 6 Residual weights of pentane (★, ☆), toluene (◆, ◇), xylene (■, □), decalin (▼, ▽), acetone (▲, △) and ethanol (●, ○) in the as-blow-molded and annealed PE bottles annealed at various temperatures for 32 hrs, respectively. The solid symbols represent the residual weights of the as-blow-molded PE bottles.

Figure 7 Residual weights of pentane (★, ☆), toluene (◆, ◇), xylene (■, ☐), decalin (▼, ▽), acetone (▲, △) and ethanol (●, ○) in the as-blow-molded and annealed PE/PA bottles annealed at various temperatures for 32 hrs, respectively. The solid symbols represent the residual weights of the as-blow-molded PE/PA bottles.

Figure 8 Residual weights of pentane (★, ☆), toluene (◆, ◇), xylene (■, □ ), decalin (▼, ▽), acetone (▲, △) and ethanol (●, ○) in the as-blow-molded and annealed PE/MPA bottles annealed at various temperatures for 32 hrs, respectively. The solid symbols represent the residual weights of the as-blow-molded PE/MPA bottles.

METHOD OF MAKING A HIGH GASOLINE PERMEATION RESISTANT PLASTIC CONTAINER

BACKGROUND OF THE INVENTION

1. Field of the Invention

The invention pertains to the field of methods of production of plastic containers, and containers produced by such methods. More particularly, the invention pertains to methods of production of plastic containers which are resistant to organic liquids and hydrocarbons such as gasoline, and containers produced by these methods.

2. Description of Related Art

Gasoline is liable to permeate out of its container. Current gasoline containers such as, for example, the common storage container and oil boxes used in a car, motor, mower, and the like, are mostly produced from material composed of high density polyethylene (HDPE) having low cost but excellent processability, as well as physical and chemical properties.

Unfortunately, HDPE containers, when used for storing gasoline, are subject to serious gasoline permeation that results in problems associated with environmental protection and public health, as well as a great loss of resources. Recently, various approaches have been used successfully for improving resistance of gasoline permeation, for example, by using HDPE that has been subjected to surface fluorination (J. P Hobbs., M. Anand. And B. A. Campion, in Barrier Polymer and Structures, W. J. Koros Ed., Chapter 15, American Chemical Society, Washington (1990)) or sulfonation (W. E. Walles, in Barrier Polymer and Structures, W. J. Koros Ed., Chapter 14, American Chemical Society Washington (1990)), or using a multi-layer co-extrusion/laminar blend blow-molding process (S. Willian, Chemtech August 481 (1988)).

However, surface treatment approaches may have several disadvantages such as process risk, high pollution, high investment or difficulty in recycling the waste. On the other hand, multi-layer co-extrusion method has disadvantages of complicates in the blow-molding machine, high capital investment, and difficulty in recycling the waste. On contrary to the above-mentioned two processes, in addition to the absence of the above-described disadvantages, the laminar blend blow-molding has advantages as simple processing in that a traditional PE blow-molding machine can be used, capability of recycling and re-use of the waste, as well as lower investment over the above-mentioned two processes. Therefore, the laminar blend blow-molding technique has attracted the interest of the container manufacturer and is developing rapidly in recent years.

Nevertheless, the technical level of the laminar blend blow-molding is very high in that the parallel distribution of the growing polyamide laminar must be controlled effectively, and that, at present, it can be carried out only through using a special designed and expensive patented blow-molding machine from Dupont. The concept of lamination blow molding has been disclosed in a few patents such as ROC Pat. No. 53,999(1992) as well as U.S. Pat. No. 4,416,942 (1983) and U.S. Pat. No. 4,950,513 (1990). However, PA is incompatible with PE, and the interface adherence between them is poor, such that it is often necessary to incorporate CP into PE/PA during the processing to increase the interface adherence of PA to HDPE.

Polyolefin has characteristics of low cost, low weight, good environmental stress cracking, excellent compact resistance, low moisture absorption, easy processability and flexibility in product designing. It thus becomes the most commonly used packaging materials. However, when used for packaging organic liquids and vapors, it has often suffered from its low permeation resistance.

Various prior art techniques for improving the permeation resistance of the polyolefin has been proposed, such as those described in, for example, U.S. Pat. Nos. 2,811,468; 3,862,284; 3,998,180; 4,081,574; 4,142,032; 4,394,333; and 4,467,075, wherein processes for surface treating plastic film and container with fluorine or bromine gases to improve effectively permeation resistance with respect to the solvent but not to the vapor were disclosed.

Further, JK No.55-80439 disclosed a process for treating surface of polyolefin article with a fluorocarbon plasma; U.S. Pat. No. 4,182,457, JK No.59-103726 and JK No.59-103727 disclosed processes for co-extruding six-layer structure of polypropylene/adhesive layer/ethylene-vinyl alcohol copolymer/adhesive layer/regenerated material/polypropylene and then blow-molding by using ethylene-vinyl alcohol copolymer (EVOS) as the barrier layer, characterized in that the product thus produced can resist effectively the permeation of gas.

U.S. Pat. Nos. 3,857,754 and 3,975,463 disclosed production of a resistant 3-layer film by blending homogeneously a polyolefin, ethylene-vinyl alcohol copolymer and carboxylated thermoplastic resin with high shear equipment. As the technique to improve the permeation resistance of polyolefin with polyamide, U.S. Pat. No. 3,873,667 disclosed a method for improving a blend of polyolefin/polyamide by thermal treatment.

U.S. Pat. Nos. 3,373,222, 3,373,223 and 3,373,224 disclosed the use of a carboxylated polyethylene-unsaturated carboxylic acid copolymer as the dispersant for improving the barrier property and the mechanical strength. Unfortunately, these patents had emphasized on the technique for the preparation of homogeneous polyolefin/polyamide blend, and can not improve effectively the barrier property of the polyolefin.

U.S. Pat. Nos. 4,410,482, 4,416,942 and 4,444,817 disclosed a heterogeneous laminar blend that is composed of a polyamide distributed within a polyolefin matrix containing a compatibilizer, and is characterized in that it had a high permeation resistance to hydrocarbon compounds. The disadvantage thereof relied on that, since the preparation of said blend comprised a dry blend step of compositions, a special extrusion equipment must be used and further, high shear force and high energy should be avoided carefully to complete the melt procession.

ROC No. 53,999 disclosed the preparation of a modified polyamide by reacting extruding aliphatic polyamide and a semi-aromatic polyamide with compatibilizer in a conventional extrusion equipment, wherein a blend of polyamide/modifiedpolyamide was produced. Unfortunately, the degree of improvement for permeation resistance could not satisfy the requirement of the environmental protection law with respect to the leakage, and therefore was unfavorable to its commercial production.

SUMMARY OF THE INVENTION

In view of the forgoing, the inventor has done extensive study and finds that a PE/MPA blend bottle can be produced by selecting appropriate composition of CP and PA, preparing modified polyamide (MPA) using a twin-screw extruder, incorporating properly said MPA into PE and finally, producing said PE/MPA blend bottle using a conventional non-expensive blow-molding machine. The PE/MPA blend bottle thus produced can achieve a high gasoline permeation resistant effect that only less than 5 vol. % of the content will permeate out of the bottle after storing at 40° C. for one year. This effect is several-fold higher than that achieved by prior art. Further, the process according to the invention can be carried out in a conventional cheap blow-molding machine instead of the patented one so that it has an advantage of low production cost.

The invention relates to a process for producing a high gasoline permeation resistant plastic blend container, comprising preparing a modified polyamide by modifying polyamide with a compatibilizer precursor and then laminar blend blow-molding using a cheap conventional blow-molding machine from a composition of a polyolefin incorporated with a modified polyamide (MPA) into a bottle. The invention relates further to a high gasoline permeation resistant container obtained according to the above-described process, characterized in that it consists of a MPA laminar structure within a HDPE matrix, and has a gasoline permeation resistance of less than 5 vol. % of the total gasoline content thereof after storage at 40° C. for one year.

DETAILED DESCRIPTION OF THE INVENTION

The polyolefin blend used in the process for producing a high gasoline permeation resistant plastic blend container according to the invention comprises of 60% to 97% by weight of polyolefin (PE) and 40% to 3% by weight of modified polyamide (MPA), wherein said modified polyamide is obtained by reacting an extrusion of 60% to 97% by weight of polyamide and 40% to 3% by weight of alkylcarboxylated polyolefin as the compatibilizer precursor (CP) with 0% to 3% by weight of free radical initiator.

In the process for producing a high gasoline permeation resistant plastic blend bottle according to the invention, the composition of the plastic blend comprises a continuous phase consisting of 60 to 97% by weight, preferably 80 to 96% by weight of polyolefin, and a non-continuous phase consisting of 40 to 3% by weight, preferably 20 to 4% by weight, of a modified polyamide.

When this composition is subjected to lamination blow molding, if the ratio of the melt viscosity of the modified polyamide to that of the polyolefin it too high or too low, the melt strength of the modified polyamide will be correspondingly worse or higher, and will be unfavorable to be stretched into a form of laminar.

The melt viscosity can be determined by a constant stress capillary viscosimeter at 230° C. The melt viscosity is desirable in a range of 0.6 to 1.5, and preferably, in a range of 0.8 to 1.3. Any inert additive or filler that does not influence the property of the finished product can be incorporated in the composition. Content of these inert additives are excluded in calculation of contents of components.

As the polyolefin useful in the process of the invention, there may be homopolymer or copolymer of suitable olefins, such as, for example, polyethylene (e.g., high density polyethylene, medium density polyethylene, linear low density polyethylene or low density polyethylene), polypropylene, poly n-butene, polyisobutene, ethylene/propylene copolymer, ethylene/n-butene copolymer or ethylene/propylene/n-hexene copolymer. Polyethylene and polypropylene are the preferred polyolefins.

As the modified polyamide useful in the process according to the invention, the composition may comprise 60 to 97% by weight of a polyamide, 40 to 3% by weight of a alkylcarboxylated polyolefin as the compatibilizer precursor, 0 to 3% by weight of a free radical initiator (based on the total weight of the polyamide and the compatibilizer precursor), and 500 to 3000 ppm of an antioxidant. In consideration of the permeation resistance of the polyamide, the content of the polyamide is preferably 70 to 95% by weight, and the content of the alkylcarboxylated polyolefin is 30 to 5% by weight.

Polyamide suitable for the preparation of the modified polyamide used in the process according to the invention comprises the aliphatic polyamide and semi-aromatic polyamide. See, for example, U.S. Pat. Nos. 2,071,251; 2,130,523; 2,241,322; 2,312,966; 2,512,606; 3,393,210; and 4,369,305.

An aliphatic polyamide can be obtained by the polycondensation reaction of a lactam, or of an aminocarboxylic acid or of a $C_4$–$C_{14}$ di-carboxylic acid with a $C_4$–$C_{14}$ diamine, or by the ring opening polymerization of a lactam. An example of the lactam may be caprolactam. Example of the aminocarboxylic acid may be 11-amino-undecanoic acid. Examples of the di-carboxylic acid may be malonic acid, adipic acid, pimelic acid, suberic acid, azelaic acid, sebacic acid, 2-aminoglutaric acid and dodecanedioic acid. Examples of the diamine may be butane diamine, pentane diamine, hexane diamine, and octane diamine.

Polyamides thus prepared include poly(adipoyl-pentane diamide), poly(adipoyl-hexamethylene diamide), poly(azelaoyl-hexamethylene diamide), poly(sebacoyl-hexamethylene diamide), poly(dodecanedioyl-hexamethylene diamide), polycaprolactam, poly(11-aminoundecanoic acid) and copolymer prepared from two or more of above-mentioned acids or amine. Among them, poly(adipoyl-hexamethylene diamide) and the blend or copolymer of polycaprolactam with poly(adipoyl-hexamethylene diamide) are the preferred ones.

A semi-aromatic polyamide is produced by polymerization of any di-carboxylic acid with any diamine, either of them having a ring structure. Suitable such dicarboxylic acid may be, for example, adipic acid, azelaic acid, terephthalic acid, isophthalic acid and cyclohexane-1,4-dicarboxylic acid. Suitable diamine may be hexamethylene diamine, trimethyl-1,6-hexamethylene diamine, 4,4'-diamino-dicyclohexyl methane, and 4,4'-diamino-3,3'-dimethyl-dicyclohexyl methane as well as lactam such as caprolactam and laurolactam. Typical semi-aromatic polyamides are, for example, terephthalic acid/adipic acid/hexamethylene diamine terpolymer, terephthalic acid/4,4"-diamino-dicyclohexyl methane/caprolactam terpolymer and the like.

For preparation of a semi-aromatic polyamide having a high molecular weight, the total mole number of the di-carboxylic acid used should be equal to the total mole number of the diamine used. Processes for the preparation of a polyamide can be a well-known polymerization process such as melt, solution or interfacial polymerization, and melt polymerization is the preferred one, which can be carried out at a temperature of 170° C. to 300° C., and a pressure of 1 atm to 300 atm.

As used herein, alkylcarboxylated polyolefin means polyolefin substituted by a alkylcarboxyl group. Said substituent can be attached to the main chain or side chain of the polyolefin and can be selected from acid, ester, anhydride or salt. If the carboxylate salt used in the alkylcarboxylated polyolefin is a carboxylic acid neutralized with a metal ion, said polyolefin is a so-called ionomer.

The carboxylated polyolefin can be prepared by direct synthesis or by grafting. The direct synthesis thereof comprises the polymerization of an α-olefin with an olefin monomer carrying a carboxyl group. The grafting method comprises introducing an olefin monomer carrying a carboxyl group into the main chain of a polyolefin. As the alkylcarboxylated polyolefin prepared by grafting method, the polyolefin may be polyethylene or polypropylene, or copolymer of ethylene with at least one $C_3$–$C_8$ α-olefin, or terpolymer of ethylene with at least one $C_3$–$C_8$ α-olefin and a diene (e.g., 1,4-hexadiene). Such polyolefin can react with an unsaturated carboxylic acid, anhydride or ester monomer to form a graft copolymer. Typical such carboxylic acid, anhydride and ester may be, for example, methacrylic acid, acrylic acid, ethacrylic acid, maleic acid, fumaric acid, dimethylene succinic acid, dodecene succinic andydride, 5-norbornene-2,3-dicarboxylic anhydride, 3,6-endomethylene-1,2,3,6-tetrahydrophthalic anhydride, glycidyl methacrylate, 2-hydroxyethyl acrylate, 2-hydroxyethyl methacrylate, diethyl succinate, ethyl succinate, di-n-butyl succinate, and mono-ester thereof. Among them, maleic anhydride, fumaric acid, acrylic acid and methacrylic acid are preferable. Typically, weight % of such graft monomer in the graft copolymer is in a range of 0.01 to 20%, preferably 0.1 to 10% and most preferably 0.2 to 5%.

As the alkylcarboxylated polyolefin prepared by a direct synthesis method, mentioned may be made of a copolymer or terpolymer of $C_2$–$C_{10}$ α-olefin with a α,β-ethylenically unsaturated carboxylic acid, ester, anhydride or salt carrying one or more carboxylic groups, wherein the weight percent of said olefin component is at least 60%, while the weight percent of said component carrying arboxyl group is in the range of 0.3 to 40% Typical such polymer may include ethylene/maleic anhydride copolymer, ethylene/maleic anhydride/n-butyl acrylate terpolymer.

An ionomer is preferably prepared by a direct synthesis method, and comprises a weight percent of olefin in a range of 80 to 90%, a weight percent of the unsaturated monomer carrying carboxyl group in a range of 20 to 2% The thus obtained polymer is then neutralized with 1 to 3 valent metal ion. The amount of such metal ion should be sufficient to neutralize at least more than 10% of the carboxyl group in order to control the neutralization degree. Typical α-olefin, unsaturated carboxylic acid, anhydride and ester monomers can be those described above.

The alkylcarboxylated polyolefin can be branched or limited crosslinked through the presence of a free radical initiator so as to improve their barrier property, melt viscosity and melt strength. Suitable free radical initiator includes peroxides, such as, cumene peroxide, α,α'-bis(t-butane peroxide di-isopropyl); azo compound, such as, azobisisobutyronitrile; and sulfides. Amount of the peroxide or azo compound used is about 0.01 to 0.5% by weight of the modified polyamide, while the amount of the sulfide used is about 0.5 to 3% by weight.

The modified polyamide used in the invention is prepared by dry mixing the polyamide, the alkylcarboxylated polyolefin and/or the free radical initiator, and then subjecting the resulting mixer to a reacting extruding. It is preferably prepared in a twin screw extruder at a high shear force and a temperature of 220° C. to 250° C. The thus prepared modified polyamide comprises a uniform and micro dispersed phase. In addition, the resulting modified polyamide exhibit excellent compatibility and adherence to the polyolefin.

Further, the screw of the extruder used for the extruding processing of the polyolefin/modified polyamide blend according to the invention can be the polyethylene type, the polyvinyl chloride type and the barrier type. It is preferable to use the latter two types having low shear force. The rotation speed of the screw is desirably from 15 rpm to 80 rpm, and preferably from 20 to 60 rpm, to facilitate the formation of lamination.

The polyolefin/modified polyamide blend as well as bottle made there from with conventional blow molding machine exhibit excellent permeation resistance against a variety of organic liquids, such as an aliphatic hydrocarbon, for example, gasoline, heptane and the like; aromatic hydrocarbons, for example, toluene, xylene and the like; halogenated hydrocarbons, for example, trichloroethane, o-dichlorobenzene and the like; and paint thinner; as well as vapors of these organic liquids.

The invention will be illustrated in more detail by way of the following non-limiting example.

EXAMPLE

Materials and Sample Preparation

Different contents of compatibilizer precursor (CP) were used to prepare different modified polyamide (MPA) resins by blending them with the polyamide (PA). The compatibilizer precursor used in this study is a zinc-neutralized ethylene/acrylic acid copolymer, which was kindly supplied from Formosa Chemicals and Fiber Corporation. The type of PA used nylon 6, which was obtained from Formosa Chemicals and Fiber Corporation with a trade name of Sunylon 6N. The polyethylene (HDPE Taisox 9003) and antioxidant (Irganox B225) used in this study were obtained from Formosa Plastic Corporation and Ciba-Geigy Corporation, respectively.

Before melt blending, PA and CP were dried at 80° C. for 16 hrs and 60° C. for 8 hrs, respectively. About 1500 ppm of antioxidant was dry-blended with the dried components of PA/CP at a 85:15 weight ratio and then fed into an Ekegai PCM 45 co-rotating twin screw extruder to make MPA resins.

The extruder was operated at 220° C. in the feeding zone and at 240° C. towards the extrusion die with at a screw of 100 rpm. The CP modified polyamides (MWA) obtained from the twin screw extruder were quenched in cold water at about 15° C. and cut into the from of pellets. Formation of CP-grafted-PA copolymers though the reaction of carboxyl groups of CP with the terminal groups of Pa has been reported during the preparation of MPA.

Each type of MPA pellets, prepared from the twin screw extruder, was dried at 80° C. for 16 hrs, and then dry blended with PE at a 10:90 weight ratio. The mixed PE/PA blends were then blow-molded in a Jonh Huah TPH-550 extrusion-blow-molding machine using an extrusion temperature of 230° C. and a screw speed of 400 rpm. A conventional polyethylene screw was used to extrude the PE/MPA blend before blow molding. The blow-molded bottles weigh about 100 grams, and have a capacity of about 750 ml and a wall thickness of about 2 mm.

For purposes of comparison, bottles were also prepared from base PE resin by using the same screw and blow-molding machine, while operated at an extrusion temperature of 190° C. and a screw speed of 400 rpm. The as-blow-molded PE, PE/PA and PE/MPA bottles prepared above were annealed at varying temperatures for various amounts of time. The annealing temperatures used in this study are 60, 70, 80, 90, 100, 110 and 120° C., respectively. At each annealing temperature, the bottles were annealed for 1, 2, 4, 8, 16, 24 and 36 hrs, respectively. Table I, below, summarizes the thermal treatment conditions and sample designations the PE, PE/PA and PE/MPA bottles prepared in this study.

Permeation Test

The permeation barrier properties of the as-blow-molded and annealed bottles were evaluated by measuring the weight loss of gasoline contained in the bottles. PE, PE/PA and PE/MPA bottles were initially filled with 308 grams of gasoline. The weight loss of gasoline was determined after the filled bottles at 40° C. for 14 days. On the other hand, the permeation barrier properties of PA and MPA resins were determined based on their hot-pressed sheets, because it is well known that pure PA and MPA resins are difficult to process by blow-molding due to their poor melt strengths. The dried pellets of PA and MPA were hot-pressed into about 2 mm thick sheets and cut into circles of 14 cm diameter. The circular PA and MPA sheets were sealed as lids on the top of test flasks filled with 250 grams of gasoline. The permeation barrier properties of the circular sheet were then determined by measuring the weight loss of gasoline after the flasks at 40° C. for 14 days.

The gasoline permeation rate of each of the bottle or hot-pressed sheet was estimated based on the average permeation rate of at least three bottles or hot-pressed sheet samples, respectively.

Compositions of Gasoline Fuels Before and After Permeation Tests

The compositions of unleaded gasoline fuels before and after permeation tests of the bottles were determined using a China 8900 Gas Chromatography (GC) equipped with a hydrogen flame ionization detector. A Restek Alumina Plot capillary column was used for separation of the methanol/gasoline fuels. The capillary column had an inside diameter of 0.53 mn and a length of 30 m. The gasoline fuels before and after permeation tests were injected into the GC at 230° C. to determine their compositions. Helium (He) flowing at 20 cc/min was use as the carrier gas at 220° C. In order to improve the separation efficiency, the capillary column was raised from 30 to 210° C. at a heating rate of 4° C./min. The detector temperature was set at 230° C.

The main components contained in unleaded gasoline fuels are non-polar linear, cyclic and aromatic hydrocarbons (about 5 to 10 carbons) and some polar liquids, such as acetone, ethanol and other additives. For purposes of comparison and convenience, the residual weight percentage (wt %) of the hydrocarbon components with 5 to 10 main-chain carbon atoms (i.e. n-pentane, xylene, toluene and decalin) and polar components (i.e. acetone and ethanol) of the gasoline fuel were selected and determined by GC to illustrate the compositions of the residual gasoline fuels after permeation tests. The residual wt % of each solvent was determined by the area ratio of each solvent peak after the permeation test to that before the permeation test.

Thermal Properties

The thermal properties of PE, PA, CP and MPA in PE, PE/PA and PE/MPA bottles were determined using a Du Pont 2010 differential scanning calorimetry (DSC), respectively. All scans were carried out at a heating rate of 10° C./min and under flowing nitrogen at a flow rate of 25 ml/min. The instrument was calibrated using pure indium. Samples weighting about 15 mg were placed in standard aluminum sample pans for each DSC experiment. The crystallinity values of PE and CP were estimated using baselines drawn from 30 to 160° C. and a perfect heat of fusion of PE of 293 J/g. The crystallinity values of PA or MPA present in PE/CP/PA and PE/MPA bottles were evaluated using baselines drawn from 170 to 250° C. and a perfect heat of fusion of 190 J/g. Baselines used in the experiment were adjusted to have a maximum fluctuation of less than 0.04 mw over the temperature range of interest. With these baselines, the maximum variation of heat of fusion was normally around +3 J/g, which resulted in 1% error in estimating the crystallinity value.

Morphology of the As-blow-molded and Annealed Bottles

In order to observe the deformation structures of MPA and PA resins in the as-blow-molded and annealed PE/PA and PE/MPA bottles, respectively, these bottles were first sectioned by a scalpel, and then etched with formic acid. The etched samples were then fold-coated and examined using a Joel JSM-5200 Scanning Electron Microscopy (SEM). For purposes of comparison, the etched samples of the as-blow-molded and annealed PE bottles were examined by using SEM as well.

RESULTS AND DISCUSSION

Gasoline Permeation Properties of PE, PA, CP and MPA Hot-pressed Sheet and PE, PE/PA and PE/MPA As-blow-molded Bottles The gasoline permeation rates of PE, PA, CP and MPA hot-pressed sheet are summarized in Table II, below. Among the three base resins (i.e. PE, CP and PA), PA sheet exhibits the best, while CP sheet exhibits the worst, resistance against gasoline permeation. The modified polyamide (MPA) sheet exhibits much better gasoline permeation resistance than PA sheet. The gasoline permeation rate of MPA sheet is about 49 and 7 times slower than those of PE and PA sheets, respectively (see Table II). Similar to the results found for hot-pressed sheet, the gasoline permeation resistance of the as-blow-molded PE bottle is the poorest among the PE, PE/PA and PE/MPA bottles prepared in this study.

As shown in Table II, the gasoline permeation resistance improves dramatically after blending PA or MPA in PE during blow-molding, and the order of barrier improvement is corresponding to the order of barrier improvement of the barrier resins added in PE. After blending 10 wt % of MPA or PA in PE, the gasoline permeation rate of the as-blow-molded PE/MPA or PE/PA bottles is about 130 or 15 times slower than that of the as-blow-molded PE bottle, respectively.

Gasoline Permeation Properties of the Annealed PE, PE/PA and PE/MPA Bottles

Figure 1:
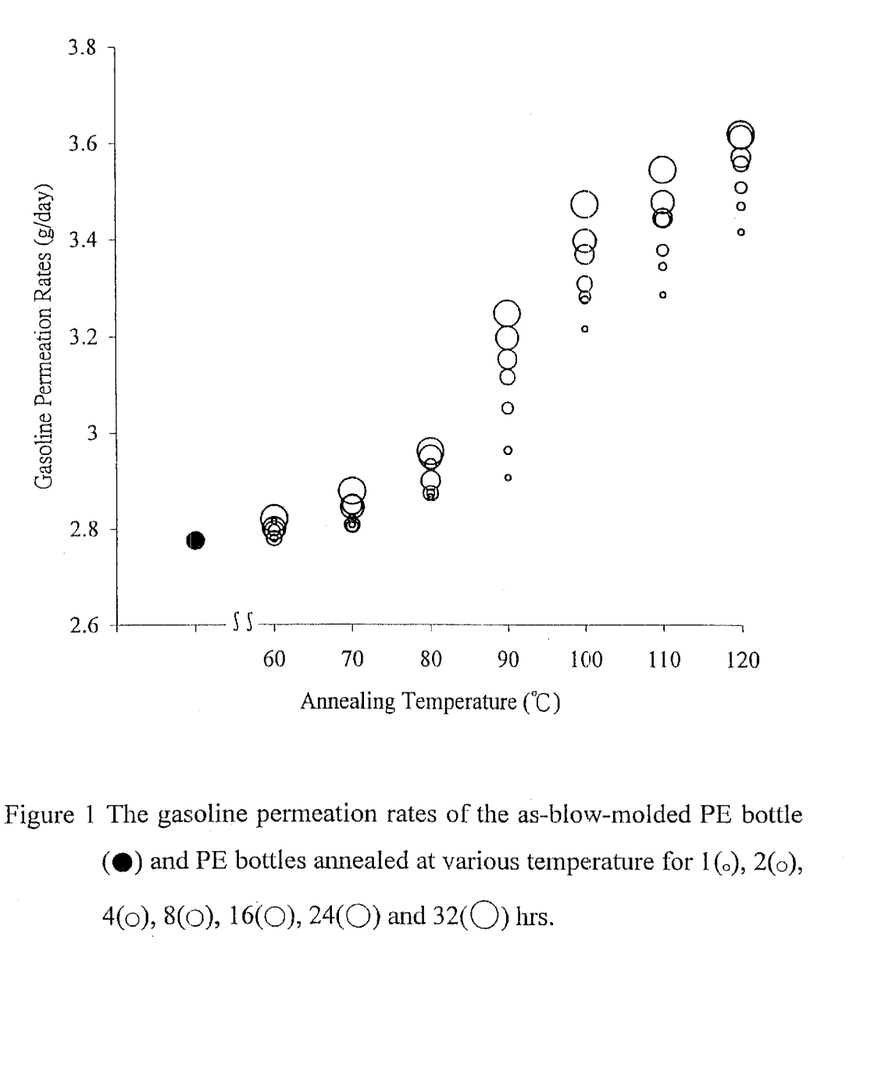
FIG. 1 is a diagram showing the gasoline permeation profile of a PE bottle of the prior art.

Somewhat surprising, the gasoline permeation rates increased significantly after the as-blow-molded PE bottles were annealed at temperatures ranging from 60 to 120° C. for varying amounts of time (see FIG. 1). In fact, their gasoline permeation rates increased consistently with the annealing temperature and time. For instance, the gasoline permeation rate of PE bottle annealed at 120° C. for 32 hours was about 30% faster than that of the as-blow-molded PE bottle.

Figure 2:
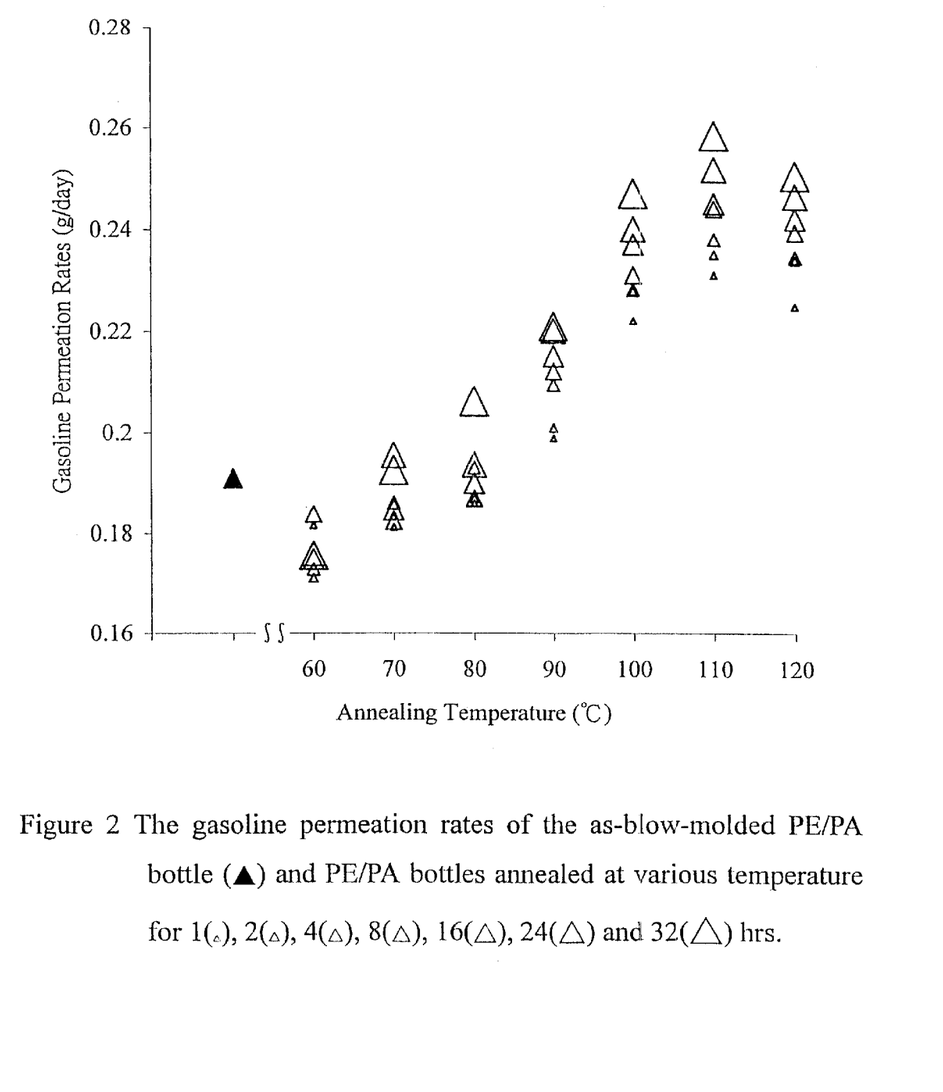
FIG. 2 is a diagram showing the gasoline permeation profile of a PE/PA bottle or the prior art.

Similar to those results found for the annealed PE bottles, the gasoline permeation rates also increased significantly with the annealing temperature and time, when PE/PA bottles were annealed at 90° C. or higher temperatures (see FIG. 2).

Figure 3:
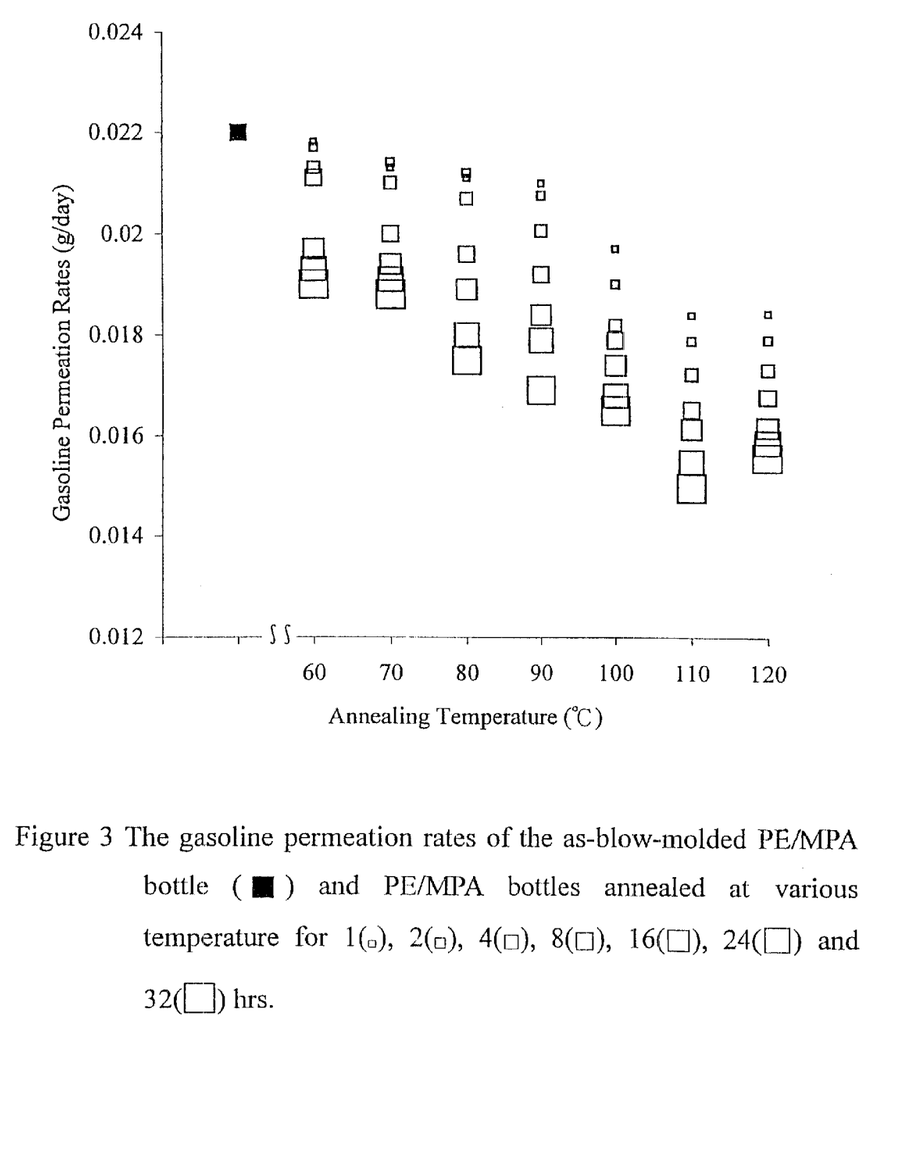
FIG. 3 is a diagram showing the gasoline permeation profile of a PE/MPA bottle of the invention.

However, the gasoline permeation rates of the PE/PA bottle reduced slightly as it was annealed at 60° C. for varying amounts of time. In contrast, as shown in FIG. 3, the gasoline permeation rates of the annealed PE/MPA bottles reduce consistently with the annealing temperature and time. After annealing PE/MPA bottles at 120° C. for 32 hours, the gasoline permeation rate of the annealed PE/MPA bottle reduces by about 30% as compared to that of the as-blow-molded PE/MPA bottle, which is, equivalent to about 190 and 240 times slower than those of the as-blow-molded and corresponding annealed PE bottles, respectively.

Morphology of the As-blow-molded and Annealed PE, PE/PA and PE/MPA Bottles

Figure 4:
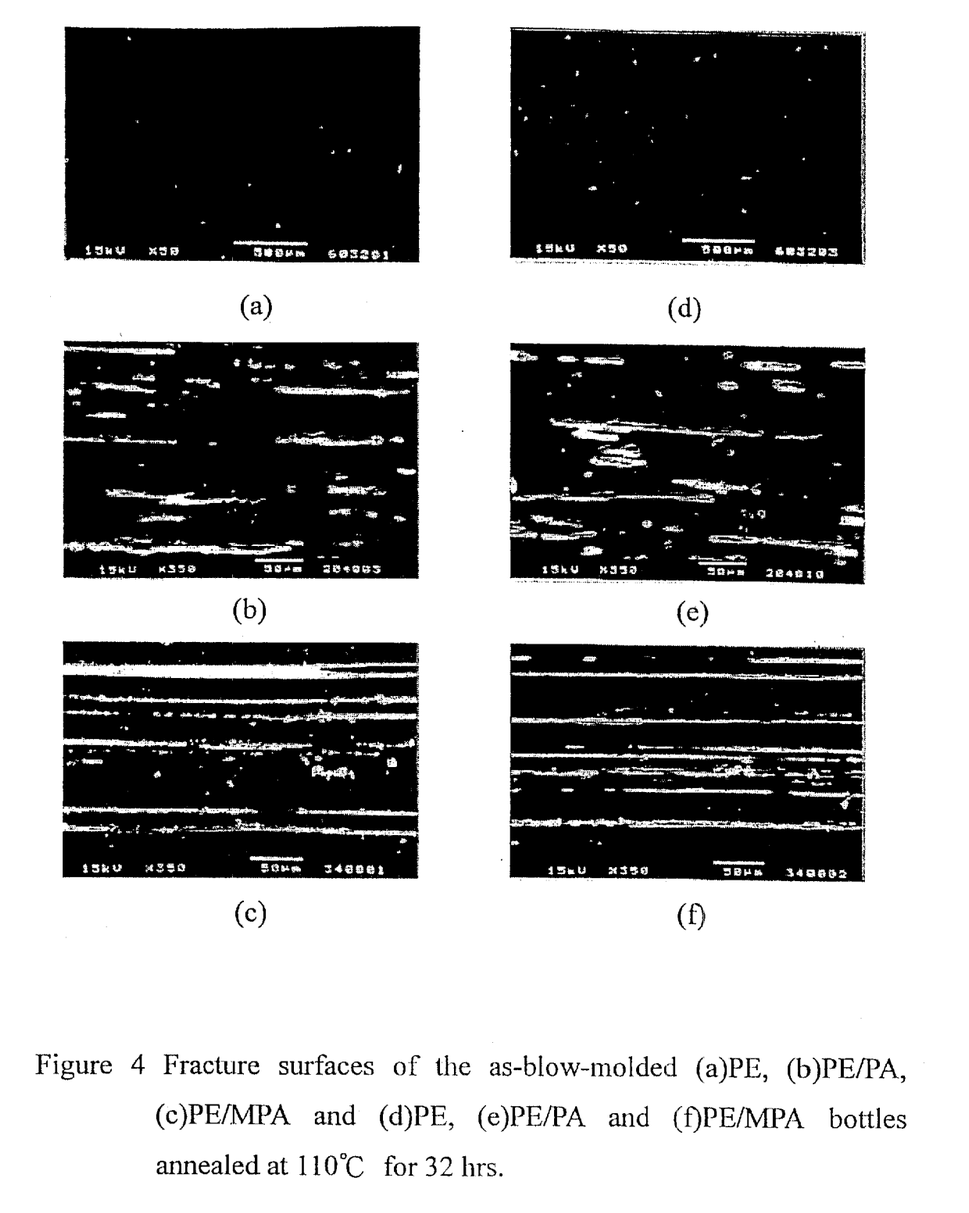
FIG. 4 is a microphotograph showing fracture surfaces of the prior art PE and PE/PA bottles, and the PE/MPA bottles of the invention.

Typical micrographs of the fracture surfaces of PE, PE/PA and PE/MPA bottles are summarized in FIG. 4. Many clearly defined MPA laminas were found distributed in the PE matrices through the wall thickness direction of the as-blow-molded PE/MPA bottle (see FIG. 4c). Somewhat broken and less demarcated PA laminae were found on the fracture surface of the as-blow-molded PE/PA bottle (see FIG. 4b). Presumably, the level of barrier improvements of PE/MPA and PE/PA bottles depends significantly on the barrier properties of the base barrier resins. Moreover, the demarcated and elongated MPA laminae can further prolong the permeation period of the permeant molecules and improve the gasoline permeation resistance of PE/MPA bottle compared to that of the PE/PA bottle with its relatively obscure and broken PA laminar structures.

On the other hand, it is interesting to note that no significant change in fracture surf ace morphology was found on the annealed PE, PE/PA and PE/MPA bottles as compared to that of their as-blow-molded bottles, respectively (see FIGS. 4d to 4f). Based on these premises, the significant change in the gasoline described above is not likely to be due to the morphology change after the annealing treatments.

Thermal Properties of PE, PE/PA and PE/MPA Bottles

Figure 5A:
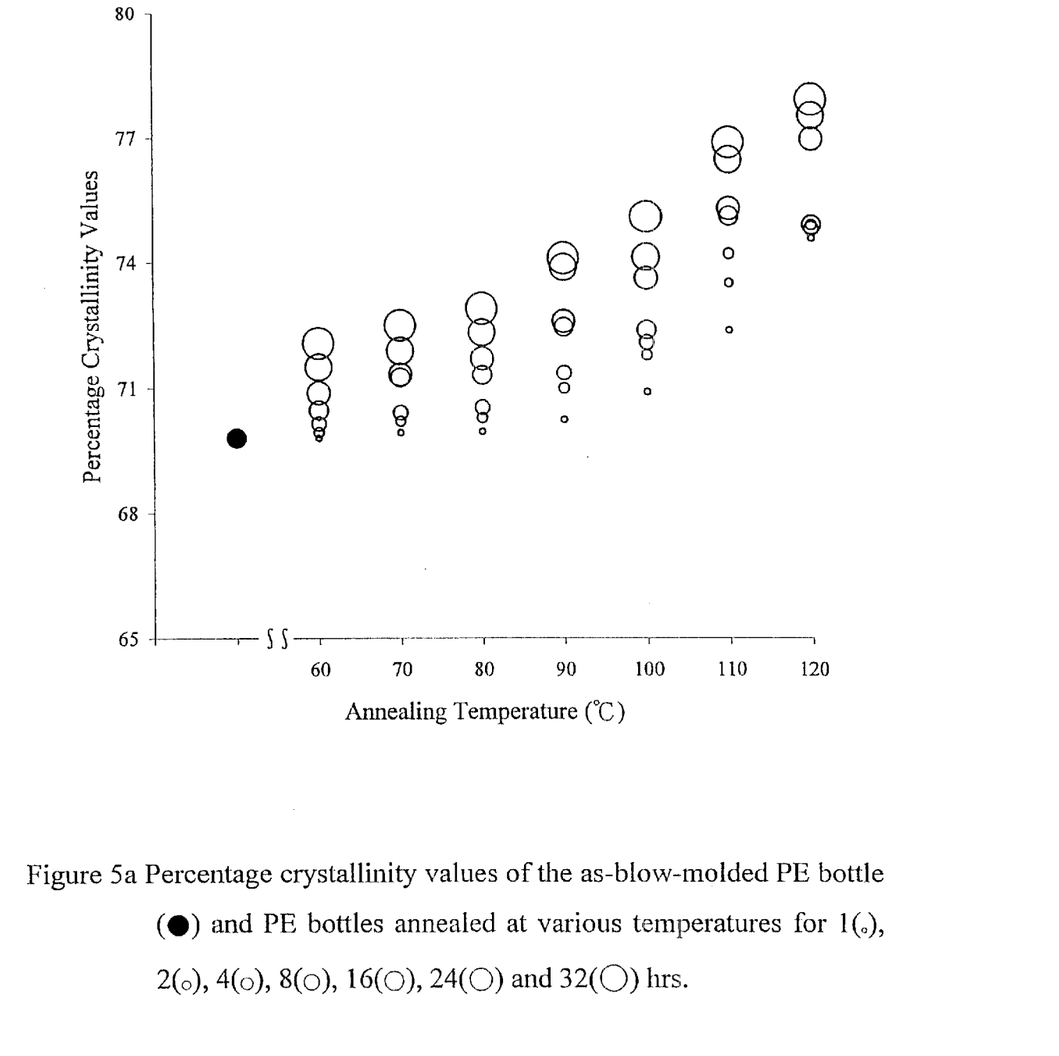
FIG. 5a is a diagram showing the percent crystallinities of a PE bottle of the prior art.
Figure 5B:
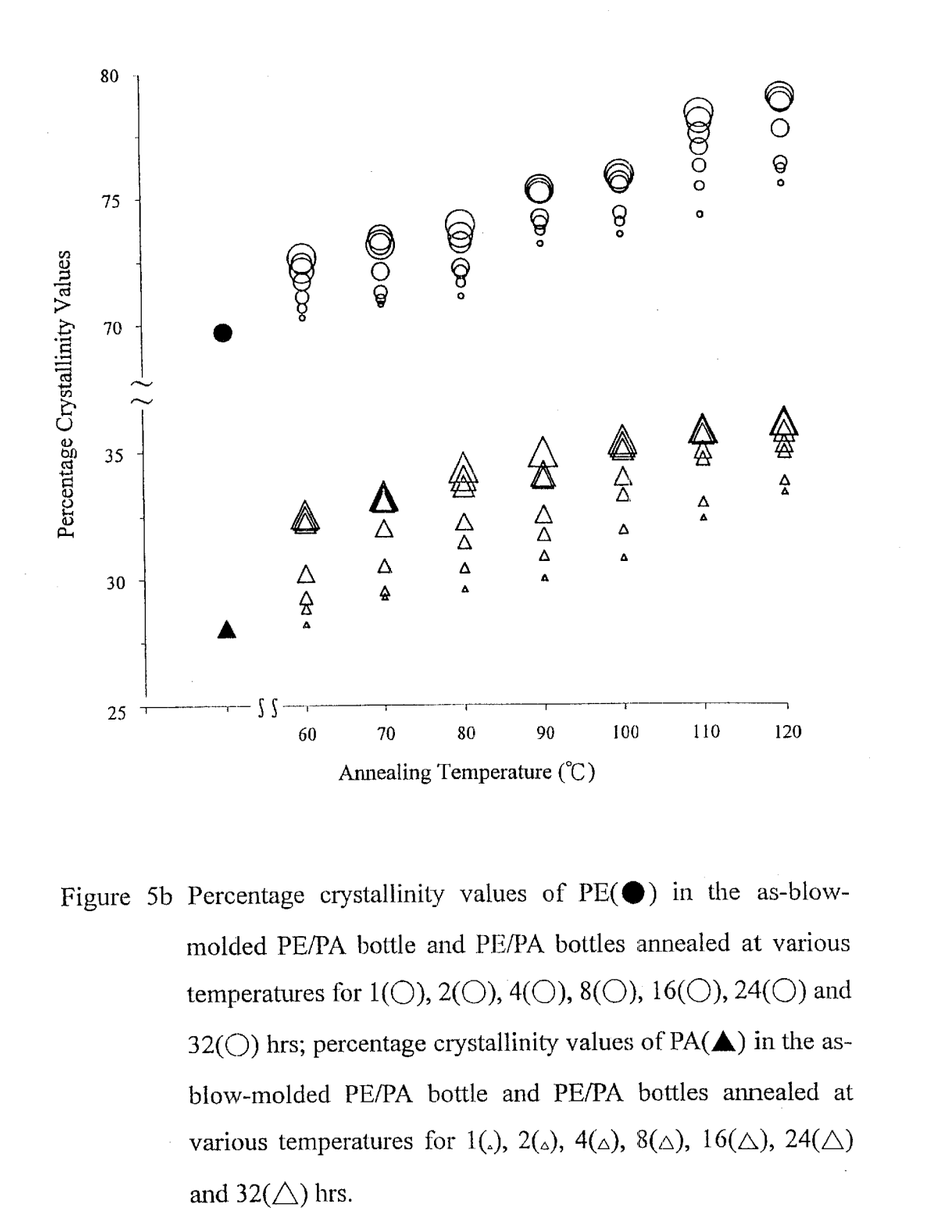
FIG. 5b is a diagram showing the percent crystallinities of PE in a PE/PA bottle of the prior art.
Figure 5C:
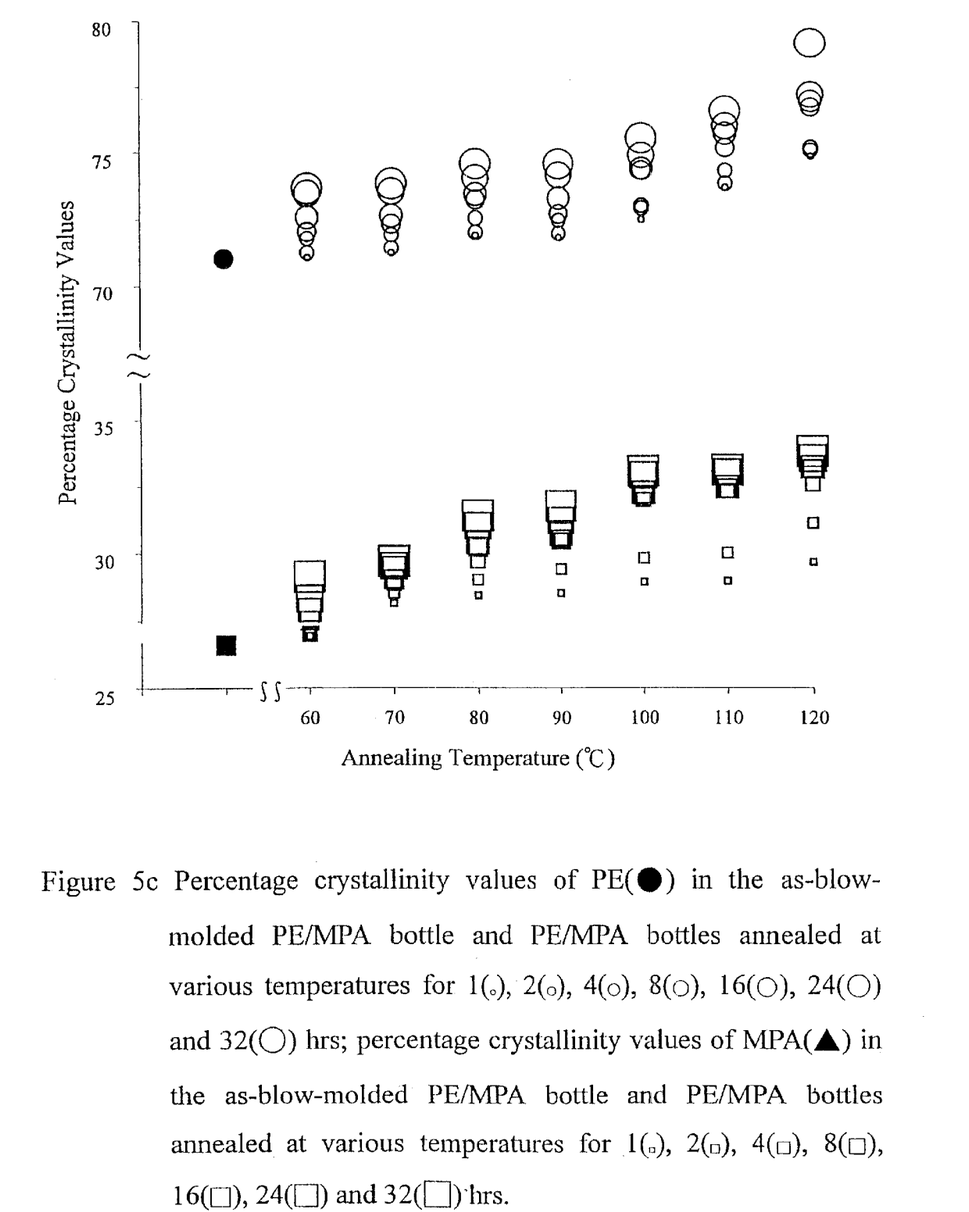
FIG. 5c is a diagram showing the percent crystallinities of PE in the PE/MPA bottle of the invention.

The crystallinity values (Wc) of PE in the as-blow-molded and annealed PE, PE/PA and PE/MPA bottles are summarized in FIGS. 5a to 5c. At any annealing temperature used in this study the crystallinity values of PE in these annealed bottles are higher than that of the as-blow-molded PE bottle, and increase significantly as the annealing time increases. In fact, it is also interesting to note that, at a fixed annealing time, Wc of PE in the annealing PE, PE/PA and PE/MPA bottles increase significantly as the annealing temperatures increase. As shown in FIGS. 5a to 5c, Wc of PE in the annealed bottles increase by about 8% after annealing them at 120 C. for 32 hours. Similarly, Wc of PA and MPA in annealed PE/PA and PE/MPA bottles also increase significantly with the annealing treatments. For instance, Wc of PA and MPA in the annealed bottles increase by about 6 and 5% after annealing them at 120 C. for 32 hours, respectively.

Compositions of Gasoline Fuels Before and After Permeation Tests

Figure 6:
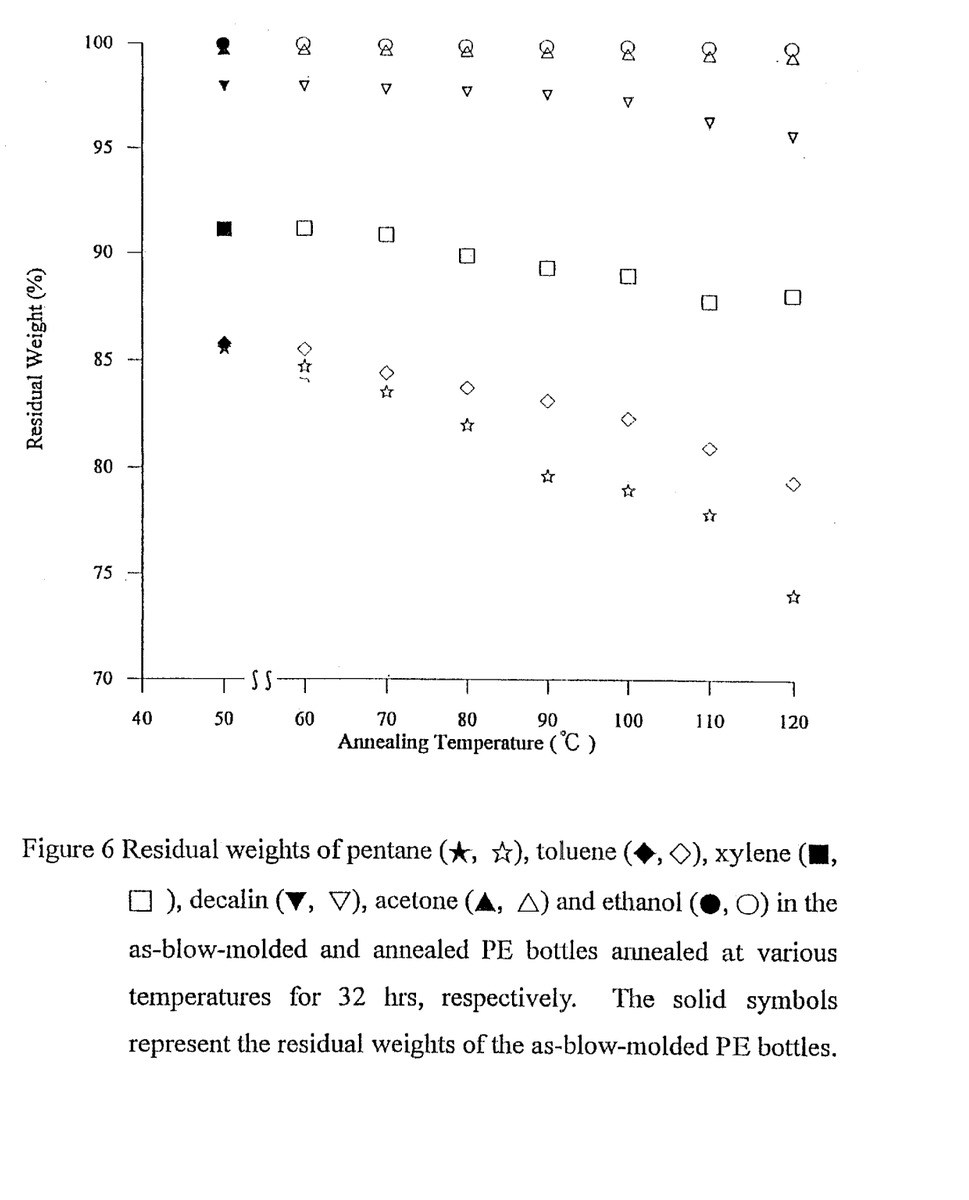
FIG. 6 is a diagram showing the residual weight % of pentane, toluene, xylene, decalin, acetone and ethanol in a PE bottle of the prior art.
Figure 7:
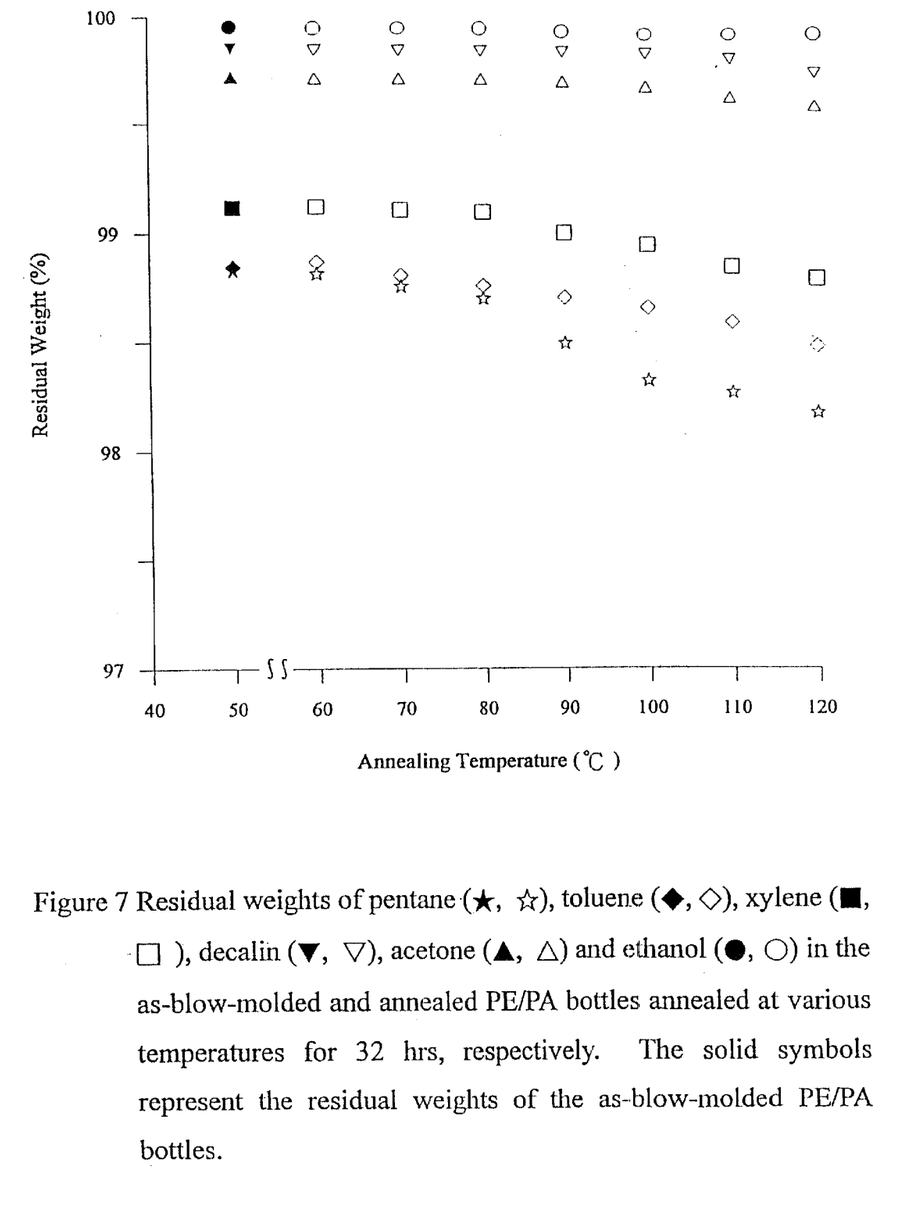
FIG. 7 is a diagram showing the residual weight % of pentane, toluene, xylene, decalin, acetone and ethanol in a PE/PA bottle of the prior art.
Figure 8:
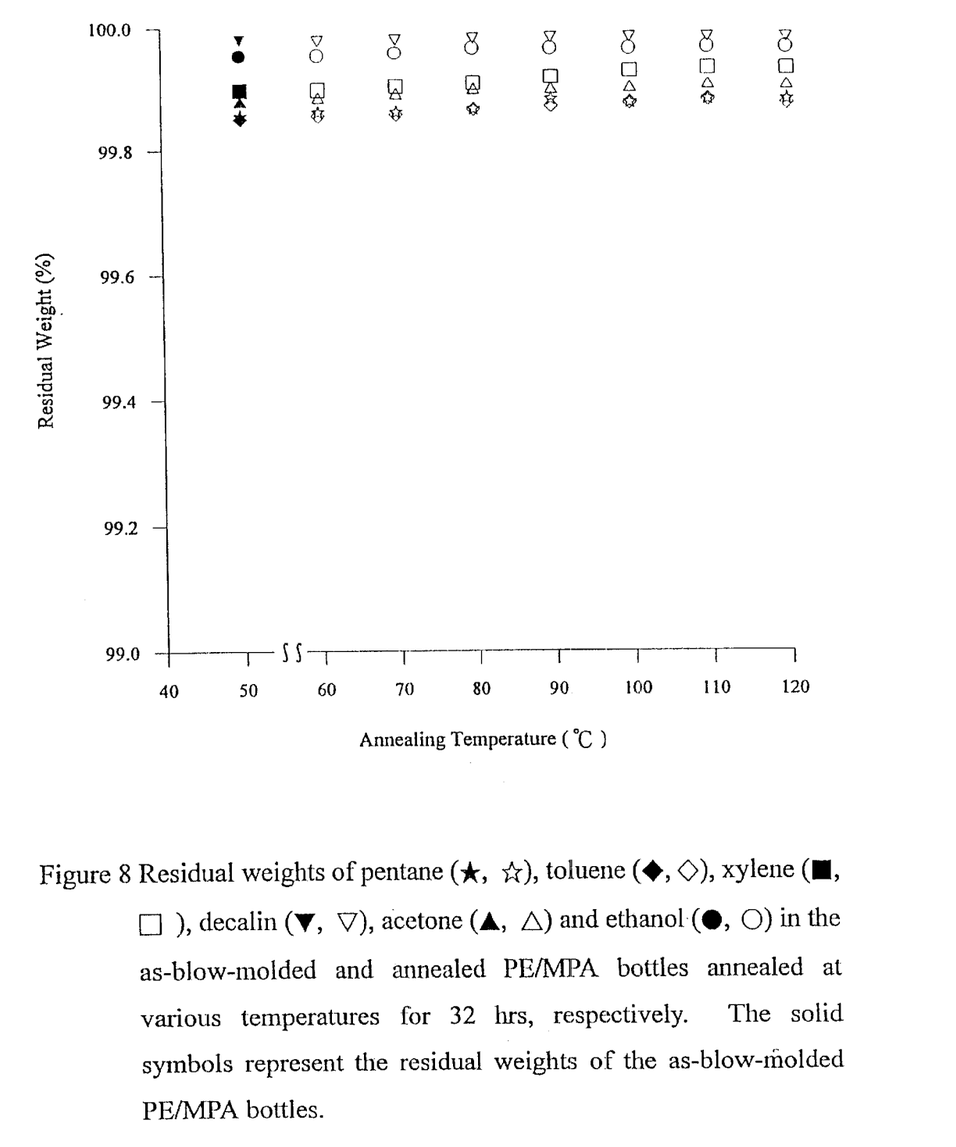
FIG. 8 is a diagram showing the residual weight % of pentane, toluene, xylene, decalin, acetone and ethanol in the PE/MPA bottle of the invention.

The typical compositions of the gasoline fuels before and after permeation tests of the as-blow-molded and annealed bottles are summarized in FIGS. 6 to 8. Significant amounts of hydrocarbon components with 5 to 10 main-chain carbon atoms (e.g. n-pentane, toluene, xylene and decalin) in gasoline fuels permeated through the as-blow-molded PE bottle, while the polar components (e.g. acetone and ethanol) remained, almost intact, without permeation after 14 days at 40° C. (see FIG. 6).

To the contrary, after blending the barrier resins in PE matrix, the relatively non-polar hydrocarbon components present in the gasoline fuel were significantly blocked without permeation during the permeation tests, wherein the as-blow-molded PE/MPA bottle blocked the permeation of hydrocarbon components more successfully than the as-blow-molded PE/PA bottle (see FIGS. 7 and 8). However, the amounts of polar components (e.g. acetone and ethanol) permeating through the as-blow-molded PE/PA and PE/MPA bottles are very small and about the same as those through the as-blow-molded PE bottle. Somewhat surprising, the permeated amounts of both non-polar hydrocarbon and polar components of the annealed PE bottles are more than those of the as-blow-molded PE bottle, and increase consistently with the annealing temperature and time (see FIG. 6). As shown in FIG. 7, similar trends were found on the PE/PA bottles annealed at 90° C. or higher temperatures for varying amounts of time. To the contrary, after any annealing treatment performed on PE/MPA bottles, the permeated amounts of both the relatively non-polar hydrocarbon and polar components reduced consistently with the annealing temperature and time (see FIG. 8).

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

TABLE I

Thermal Treatment Conditions for PE, PE/PA and PE/MPA Bottles

| Samples | Annealing temperature (° C.) | Annealing time (hr) | Samples | Annealing temperature (° C.) | Annealing time (hr) |
|---|---|---|---|---|---|
| PE, PE/PA, PE/MPA | — | — | $PE_{90-8}$, $PE/PA_{90-8}$, $PE/MPA_{90-8}$ | 90 | 8 |
| $PE_{60-1}$, $PE/PA_{60-1}$, $PE/MPA_{60-1}$ | 60 | 1 | $PE_{90-16}$, $PE/PA_{90-16}$, $PE/MPA_{90-16}$ | | 16 |
| $PE_{60-2}$, $PE/PA_{60-2}$, $PE/MPA_{60-2}$ | | 2 | $PE_{90-24}$, $PE/PA_{90-24}$, $PE/MPA_{90-24}$ | | 24 |
| $PE_{60-4}$, $PE/PA_{60-4}$, $PE/MPA_{60-4}$ | | 4 | $PE_{90-32}$, $PE/PA_{90-32}$, $PE/MPA_{90-32}$ | | 32 |
| $PE_{60-8}$, $PE/PA_{60-8}$, $PE/MPA_{60-8}$ | | 8 | $PE_{100-1}$, $PE/PA_{100-1}$, $PE/MPA_{100-1}$ | 100 | 1 |
| $PE_{60-16}$, $PE/PA_{60-16}$, $PE/MPA_{60-16}$ | | 16 | $PE_{100-2}$, $PE/PA_{100-2}$, $PE/MPA_{100-2}$ | | 2 |
| $PE_{60-24}$, $PE/PA_{60-24}$, $PE/MPA_{60-24}$ | | 24 | $PE_{100-4}$, $PE/PA_{100-4}$, $PE/MPA_{100-4}$ | | 4 |
| $PE_{60-32}$, $PE/PA_{60-32}$, $PE/MPA_{60-32}$ | | 32 | $PE_{100-8}$, $PE/PA_{100-8}$, $PE/MPA_{100-8}$ | | 8 |
| $PE_{70-1}$, $PE/PA_{70-1}$, $PE/MPA_{70-1}$ | 70 | 1 | $PE_{100-16}$, $PE/PA_{100-16}$, $PE/MPA_{100-16}$ | | 16 |
| $PE_{70-2}$, $PE/PA_{70-2}$, $PE/MPA_{70-2}$ | | 2 | $PE_{100-24}$, $PE/PA_{100-24}$, $PE/MPA_{100-24}$ | | 24 |
| $PE_{70-4}$, $PE/PA_{70-4}$, $PE/MPA_{70-4}$ | | 4 | $PE_{100-32}$, $PE/PA_{100-32}$, $PE/MPA_{100-32}$ | | 32 |
| $PE_{70-8}$, $PE/PA_{70-8}$, $PE/MPA_{70-8}$ | | 8 | $PE_{110-1}$, $PE/PA_{110-1}$, $PE/MPA_{110-1}$ | 110 | 1 |
| $PE_{70-16}$, $PE/PA_{70-16}$, $PE/MPA_{70-16}$ | | 16 | $PE_{110-2}$, $PE/PA_{110-2}$, $PE/MPA_{110-2}$ | | 2 |
| $PE_{70-24}$, $PE/PA_{70-24}$, $PE/MPA_{70-24}$ | | 24 | $PE_{110-4}$, $PE/PA_{110-4}$, $PE/MPA_{110-4}$ | | 4 |
| $PE_{70-32}$, $PE/PA_{70-32}$, $PE/MPA_{70-32}$ | | 32 | $PE_{110-8}$, $PE/PA_{110-8}$, $PE/MPA_{110-8}$ | | 8 |
| $PE_{80-1}$, $PE/PA_{80-1}$, $PE/MPA_{80-1}$ | 80 | 1 | $PE_{110-16}$, $PE/PA_{110-16}$, $PE/MPA_{110-16}$ | | 16 |
| $PE_{80-2}$, $PE/PA_{80-2}$, $PE/MPA_{80-2}$ | | 2 | $PE_{110-24}$, $PE/PA_{110-24}$, $PE/MPA_{110-24}$ | | 24 |
| $PE_{80-4}$, $PE/PA_{80-4}$, $PE/MPA_{80-4}$ | | 4 | $PE_{110-32}$, $PE/PA_{110-32}$, $PE/MPA_{110-32}$ | | 32 |
| $PE_{80-8}$, $PE/PA_{80-8}$, $PE/MPA_{80-8}$ | | 8 | $PE_{120-1}$, $PE/PA_{120-1}$, $PE/MPA_{120-1}$ | 120 | 1 |
| $PE_{80-16}$, $PE/PA_{80-16}$, $PE/MPA_{80-16}$ | | 16 | $PE_{120-2}$, $PE/PA_{120-2}$, $PE/MPA_{120-2}$ | | 2 |
| $PE_{80-24}$, $PE/PA_{80-24}$, $PE/MPA_{80-24}$ | | 24 | $PE_{120-4}$, $PE/PA_{120-4}$, $PE/MPA_{120-4}$ | | 4 |
| $PE_{80-32}$, $PE/PA_{80-32}$, $PE/MPA_{80-32}$ | | 32 | $PE_{120-8}$, $PE/PA_{120-8}$, $PE/MPA_{120-8}$ | | 8 |
| $PE_{90-1}$, $PE/PA_{90-1}$, $PE/MPA_{90-1}$ | 90 | 1 | $PE_{120-16}$, $PE/PA_{120-16}$, $PE/MPA_{120-16}$ | | 16 |
| $PE_{90-2}$, $PE/PA_{90-2}$, $PE/MPA_{90-2}$ | | 2 | $PE_{120-24}$, $PE/PA_{120-24}$, $PE/MPA_{120-24}$ | | 24 |
| $PE_{90-4}$, $PE/PA_{90-4}$, $PE/MPA_{90-4}$ | | 4 | $PE_{120-32}$, $PE/PA_{120-32}$, $PE/MPA_{120-32}$ | | 32 |

TABLE II

Gasoline Permeation Rates of PE, PA, CP and MPA Hot-pressed Sheets and PE, PE/PA and PE/MPA As-blow-molded Bottles at 40° C.

| | Hot-pressed Sheets | | | | As-blow-molded bottles | | |
|---|---|---|---|---|---|---|---|
| Specimens | PE | PA | CP | MPA | PE | PE/PA | PE/MPA |
| Gasoline Permeation Rate(g/day) | $8.9 \times 10^{-1}$ | $1.3 \times 10^{-1}$ | 1.3 | $1.8 \times 10^{-2}$ | 2.8 | $1.9 \times 10^{-1}$ | $2.2 \times 10^{-2}$ |

What is claimed is:

1. A process for producing a high gasoline permeation resistant plastic blend container, comprising:

preparing a modified polyamide by modifying polyamide with a compatibilizer precursor by reacting an extrusion of 60% to 97% by weight of polyamide and 40% to 3% by weight of alkylcarboxylated polyolefin as the compatibilizer precursor;

incorporating polyolefin with the modified polyamide forming a polyolefin/modified polyamide composition; and laminar blend blow-molding a container from the polyolefin/modified polyamide composition using a blow-molding machine.

2. A process as recited in claim 1, wherein said modified polyamide is prepared by modifying polyamide with a polyolefin that has been grafted with maleic anhydride or other functional group that can react with the amide group of the polyamide.

3. A process as recited in claim 1, wherein said modified polyamide comprises 60 to 97% by weight of polyamide, 40 to 3% by weight of alkylcarboxylated polyolefin, and/or 0 to 3% by weight of a free radical initiator.

4. A process as recited in claim 3, wherein said modified polyamide comprises 70 to 95% by weight of polyamide, 30 to 5% by weight of said alkylcarboxylated polyolefin, and/or 0 to 3% by weight of a free radical initiator.

5. A process as recited in claim 1, wherein said polyamide in said modified polyamide is selected from group consisting of an aliphatic polyamide, a semi-aromatic polyamide or mixture thereof.

6. A process as recited in claim 1, wherein said polyolefin/modified polyamide composition comprises 60 to 97% by weight of polyethylene and 40 to 3% by weight of said modified polyamide.

7. A process as recited in claim 6, wherein said polyolefin/modified polyamide composition comprises 80 to 96% by weight of polyethylene and 20 to 4% by weight of said modified polyamide.

8. A process as recited in claim 1, wherein said blow molding machine comprises a machine for processing PE material or a machine for processing PVE material.

9. A process as recited in claim 1, wherein said blow molding process comprises blow molding a blend of PE and MPA.

* * * * *